(12) United States Patent
Isobe (10) Patent No.: US 10,092,989 B2
(45) Date of Patent: Oct. 9, 2018

(54) TOOL TRANSFER APPARATUS INCLUDING GRIPPING FORCE MEASURING UNIT FOR TOOL HOLDING UNIT OF TOOL MAGAZINE, AND MACHINING SYSTEM

(71) Applicant: FANUC Corporation, Yamanashi (JP)

(72) Inventor: Gaku Isobe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 359 days.

(21) Appl. No.: 15/097,501

(22) Filed: Apr. 13, 2016

(65) Prior Publication Data

US 2016/0303697 A1 Oct. 20, 2016

(30) Foreign Application Priority Data

Apr. 14, 2015 (JP) ................................. 2015-082459

(51) Int. Cl.
*B23Q 17/09* (2006.01)
*B23Q 17/00* (2006.01)
(Continued)

(52) U.S. Cl.
CPC ....... *B23Q 17/005* (2013.01); *B23Q 3/15722* (2016.11); *B23Q 3/1572* (2013.01);
(Continued)

(58) Field of Classification Search
CPC ............... Y10T 483/13; Y10T 483/132; Y10T 483/134; Y10T 483/136; Y10T 483/138;
(Continued)

(56) References Cited

U.S. PATENT DOCUMENTS 5,568,028 A * 10/1996 Uchiyama .......... G05B 19/4065
 318/433
5,631,839 A * 5/1997 Lemoine .......... G05B 19/41875
 700/108
(Continued)

FOREIGN PATENT DOCUMENTS

GB 1382444 A * 1/1975 ........... B23Q 3/1554
JP 61-117637 U 7/1986
(Continued)

OTHER PUBLICATIONS

English Abstract of JP 3348392 B2.*
Office Action in JP Application No. 2015-082459, dated Aug. 22, 2017. 9pp.

*Primary Examiner* — Sunil K Singh
*Assistant Examiner* — Yasir Diab
(74) *Attorney, Agent, or Firm* — Hauptman Ham, LLP (57) ABSTRACT

To provide a tool transfer apparatus including gripping force measuring unit for tool holding unit of a tool accommodation apparatus and a machining system including the tool transfer apparatus, a handling robot can perform operation of detaching a tool from a grip positioned at a tool attachment/detachment position of a tool magazine in a machine tool and transferring the tool to a tool stocker, and operation of transferring a tool from the tool stocker and attaching the tool to a grip positioned at the tool attachment/detachment position of the tool magazine. A hand portion of the handling robot is provided with a force sensor, which can detect a load applied to the hand portion. Also, a control apparatus of the handling robot and a control apparatus of the machine tool are connected via a data cable capable of transmission and reception of information.

10 Claims, 8 Drawing Sheets

(51) Int. Cl.
 B23Q 11/04 (2006.01)
 B23Q 3/157 (2006.01)
 B23Q 3/155 (2006.01)

(52) U.S. Cl.
 CPC ...... *B23Q 3/15539* (2016.11); *B23Q 3/15773* (2013.01); *B23Q 11/04* (2013.01); *B23Q 17/09* (2013.01); *B23Q 2003/15527* (2016.11); *G05B 2219/39528* (2013.01); *Y10T 483/132* (2015.01); *Y10T 483/136* (2015.01); *Y10T 483/138* (2015.01); *Y10T 483/16* (2015.01)

(58) Field of Classification Search
 CPC ... Y10T 483/14; Y10T 483/15; Y10T 483/16; B23Q 17/005; B23Q 17/006; B23Q 17/09; B23Q 11/04; B23Q 2003/15527; B23Q 2003/155414; B23Q 2003/155432; B23Q 3/1572; B23Q 3/15773; B23Q 23/00; B23Q 3/155; B23Q 3/157; B23Q 11/0089; B32Q 3/15722; B32Q 3/15539; B32Q 3/1554; B25J 13/08; G05B 2219/39528; G05B 2219/39529
 See application file for complete search history.

(56) References Cited

U.S. PATENT DOCUMENTS

| | | | | |
|---|---|---|---|---|
| 6,260,427 B1 * | 7/2001 | Jones | ............... | G01N 3/58 73/865.9 |
| 6,546,297 B1 * | 4/2003 | Gaston | ............... | G05B 19/0426 700/17 |
| 6,947,800 B2 * | 9/2005 | Flanagan | ............... | B21O 51/00 700/108 |
| 6,973,714 B2 * | 12/2005 | Isogai | ............... | B23Q 17/005 269/71 |
| 7,048,268 B2 * | 5/2006 | Arai | ............... | B23Q 3/06 269/285 |
| 7,139,635 B2 * | 11/2006 | Iihoshi | ............... | G05B 19/4155 700/175 |
| 2001/0027354 A1 * | 10/2001 | Kakino | ............... | G05B 19/4163 700/173 |
| 2002/0004688 A1 * | 1/2002 | Kojima | ............... | G05B 19/404 700/193 |
| 2003/0014150 A1 * | 1/2003 | Flanagan | ............... | B21C 51/00 700/175 |
| 2004/0174130 A1 * | 9/2004 | Inoue | ............... | B23Q 17/09 318/569 |
| 2006/0169050 A1 * | 8/2006 | Kobayashi | ............... | H05K 13/08 73/760 |
| 2008/0210649 A1 * | 9/2008 | Faust | ............... | A47F 5/0807 211/59.1 |
| 2013/0166071 A1 * | 6/2013 | Kranz | ............... | B25J 9/1633 700/260 |

FOREIGN PATENT DOCUMENTS

| | | |
|---|---|---|
| JP | 2-160492 A | 6/1990 |
| JP | 4-289089 A | 10/1992 |
| JP | H09-57581 A | 3/1997 |
| JP | 3348392 B2 | 11/2002 |

* cited by examiner

| GRIP NUMBER | INSPECTION 1 | INSPECTION 2 | .... | INSPECTION n |
|---|---|---|---|---|
| GRIP 1 | 50 [N] | 49 [N] | | 30 [N] |
| GRIP 2 | 49 [N] | 49 [N] | | 35 [N] |
| .... | | | | |
| GRIP m | 51 [N] | 50 [N] | | 25 [N] |

FIG. 10

TOOL TRANSFER APPARATUS INCLUDING GRIPPING FORCE MEASURING UNIT FOR TOOL HOLDING UNIT OF TOOL MAGAZINE, AND MACHINING SYSTEM

RELATED APPLICATIONS

The present application claims priority to Japanese Patent Application Number 2015-082459, filed Apr. 14, 2015, the disclosure of which is hereby incorporated by reference herein in its entirety.

BACKGROUND OF THE INVENTION

1. Field of the Invention

The present invention relates to a tool transfer apparatus including gripping force measuring unit for tool holding unit of a tool magazine included in a machining center or the like, and a machining system including the tool transfer apparatus.

2. Description of the Related Art

A tool transfer apparatus has been known which transfers a tool from a tool stocker disposed outside a machine tool to a tool magazine provided with a plurality of grips for attachment and detachment. With this, the tool can be replaced without limitation of the number of tools that can be held by the tool magazine, and automatic machining can be performed by following a machining program.

However, in the tool magazine of a type which holds tools by the grips as described above, repeated tool attachment and detachment cause abrasion or distortion in a grip component to decrease the tool gripping force, thereby disadvantageously causing a trouble such as a tool drop.

Thus, as disclosed in Japanese Patent No. 3348392, a grip life detecting method to solve this problem has been conventionally known in which the outside of a grip is interposed by a life detecting apparatus using conductive rubber to detect the amount of flexure of the grip, thereby determining a grip life. Although the presence or absence of a tool transfer apparatus is not described in Japanese Patent No. 3348392, by using this grip life detecting apparatus also when a tool transfer apparatus is used, a tool drop can be prevented.

However, it is only the grip formed of an integral member as described in Japanese Patent No. 3348392 that a grip life can be determined for by using this scheme and, disadvantageously, a life cannot be determined for a grip of a type which presses a pin or roller by a spring. Moreover, since only the flexure of the grip can be measured, it is impossible to detect a decrease in gripping force due to, for example, abrasion of a portion in contact with the tool. Furthermore, the grip life detecting apparatus is mounted on a tool magazine as a separate apparatus from an apparatus which attaches and detaches a tool to and from a grip, thereby making the structure of the tool magazine complex.

SUMMARY OF THE INVENTION

An object of the present invention is accordingly to provide a tool transfer apparatus including gripping force measuring unit for tool holding unit of a tool accommodation apparatus, and a machining system including the tool transfer apparatus.

The present invention has a feature of providing a tool transfer apparatus with a load measuring apparatus which measures a load applied to the tool transfer apparatus when a tool is attached to or detached from tool holding unit of a tool accommodation apparatus.

A machining system according to the present invention includes a machine tool including a tool accommodation apparatus having one or more tool holding unit, and a tool transfer apparatus which attaches and detaches a tool to and from the tool holding unit of the tool accommodation apparatus, and the tool transfer apparatus includes a load measuring apparatus which measures a load applied to the tool transfer apparatus when the tool is attached to or detached from the tool holding unit.

And, according to the present invention, since it is possible to measure a load at the time of attachment and detachment of the tool to and from the tool accommodation apparatus by the tool transfer apparatus, a decrease in gripping force of the tool holding unit can be found in advance, and a trouble such as a tool drop can be prevented.

Also, the machining system of the present invention further includes display unit which displays the load measured by the load measuring apparatus. And, according to the present invention, by checking the load value measured by the load measuring apparatus, a decrease in gripping force of the tool holding unit can be found early, and therefore a trouble such as a tool drop can be prevented.

Furthermore, in the machining system of the present invention, the tool transfer apparatus includes storage unit which stores the load measured by the load measuring apparatus. According to the present invention, by referring to load values stored in the tool transfer apparatus, a decrease in gripping force of the tool holding unit can be checked, and therefore a trouble such as a tool drop can be prevented.

In the machining system of the present invention, the tool transfer apparatus includes communication unit which transmits data of the load measured by the load measuring apparatus to an external apparatus. According to the present invention, by referring to load values from the tool transfer apparatus or another external apparatus, a decrease in gripping force of the tool holding unit can be checked, and therefore a trouble such as a tool drop can be prevented.

Also, in the machining system of the present invention, the tool transfer apparatus includes storage unit which stores a threshold of the load when the tool is attached or a threshold of the load when the tool is detached, and notifying unit which compares the load measured by the load measuring apparatus and one of the thresholds that is stored and makes a notification when the measured load value exceeds the threshold, the notification indicating as such. According to the present invention, when the gripping force of the tool holding unit is decreased, the tool transfer apparatus notifies as such via the notifying unit such as a message or alarm, thereby allowing a decrease in gripping force of the tool holding unit to be found early. Therefore, a trouble such as a tool drop can be prevented.

Furthermore, the machining system of the present invention further includes communication unit which transmits and receives data between the tool transfer apparatus and the machine tool, and the machine tool includes storage unit which stores a threshold of the load when the tool is attached or a threshold of the load when the tool is detached, and notifying unit which makes a notification when the load measured by the load measuring apparatus of the tool transfer apparatus exceeds the threshold of the load when the tool is attached or the threshold of the load when the tool is detached, the notification indicating as such.

According to the present invention, when the gripping force of the tool holding unit is decreased, the machine tool notifies as such via the notifying unit such as a message or alarm, thereby allowing a decrease in gripping force of the tool holding unit to be found early. Therefore, a trouble such as a tool drop can be prevented.

The machining system of the present invention has a feature in which, when the load measured by the load measuring apparatus exceeds the threshold, the tool holding unit of the tool accommodation apparatus is replaced. According to the present invention, when the gripping force of the tool holding unit is decreased, the tool transfer apparatus automatically replaces the tool holding unit, thereby eliminating the need of stopping the machining system and manually replacing the tool holding unit. Therefore, the machining system can be continuously operated without humans in attendance.

In the machining system of the present invention, storage of the load in the storage apparatus is performed at predetermined intervals, and the load is stored in the storage unit. According to the present invention, by referring to data having recorded thereon a change of the load values measured at predetermined intervals, the life of the tool holding unit for use under the same conditions can be predicted.

The machining system of the present invention has a feature in which the tool transfer apparatus is a robot. According to the present invention, when the tool is attached to or detached from the tool holding unit by the robot, a decrease in gripping force of the tool holding unit can be detected. Therefore, a trouble such as a tool drop can be prevented.

A tool transfer apparatus of the present invention includes a load measuring apparatus which measures a load applied to the tool transfer apparatus when a tool is attached to or detached from tool holding unit of a tool accommodation apparatus included in the machine tool.

And, according to the present invention, the load when the tool is attached to or detached from the tool accommodation apparatus by the tool transfer apparatus can be measured. Therefore, a decrease in gripping force of the tool holding unit can be found in advance, and a trouble such as a tool drop can be prevented.

The tool transfer apparatus of the present invention has a feature of being a self-propelled robot. With the self-propelled robot, the gripping force of the tool holding unit of the tool accommodation unit included in each of a plurality of machine tools can be efficiently measured, and the tool can be prevented from dropping off from the tool holding unit with a decreased gripping force.

As described above, with the present invention, it is possible to provide a tool transfer apparatus including gripping force measuring unit for tool holding unit of a tool accommodation apparatus, and a machining system.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

An embodiment of the present invention is described below by using the drawings.

Figure 1:
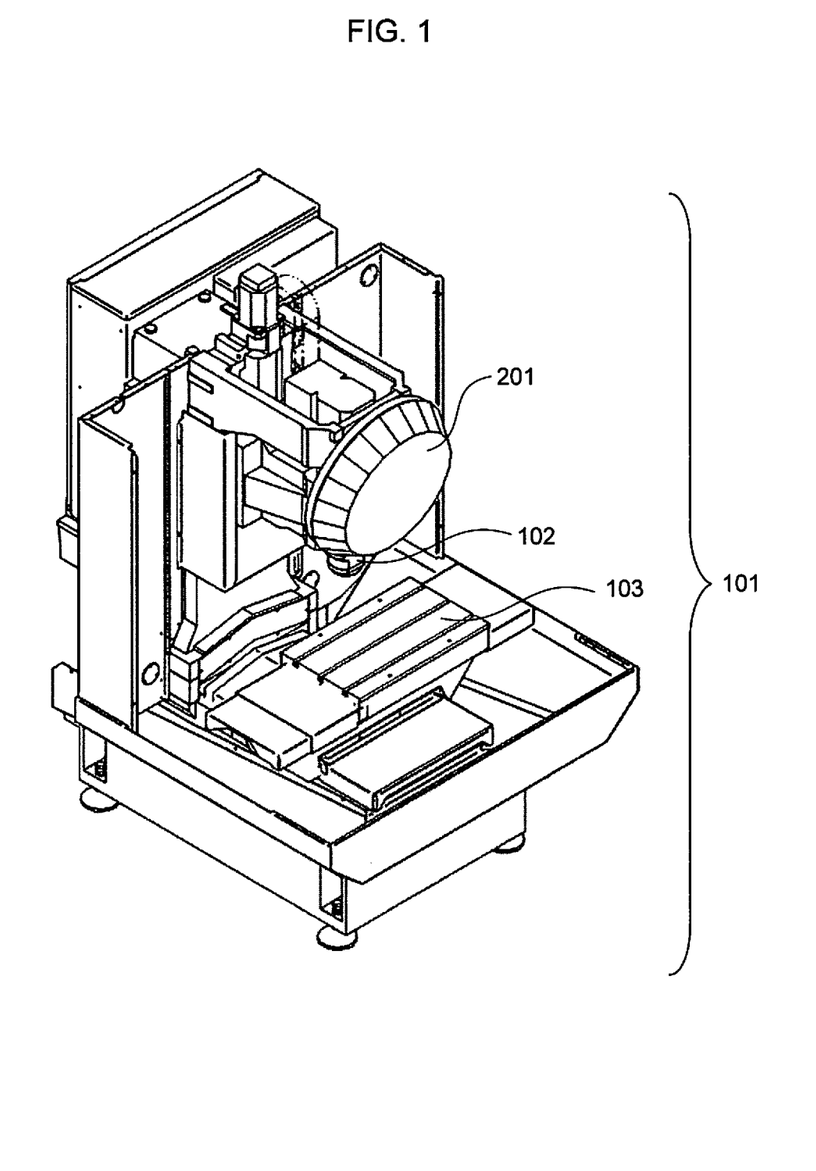
FIG. 1 is an external perspective view of a machine tool including a tool accommodation apparatus.
Figure 2:
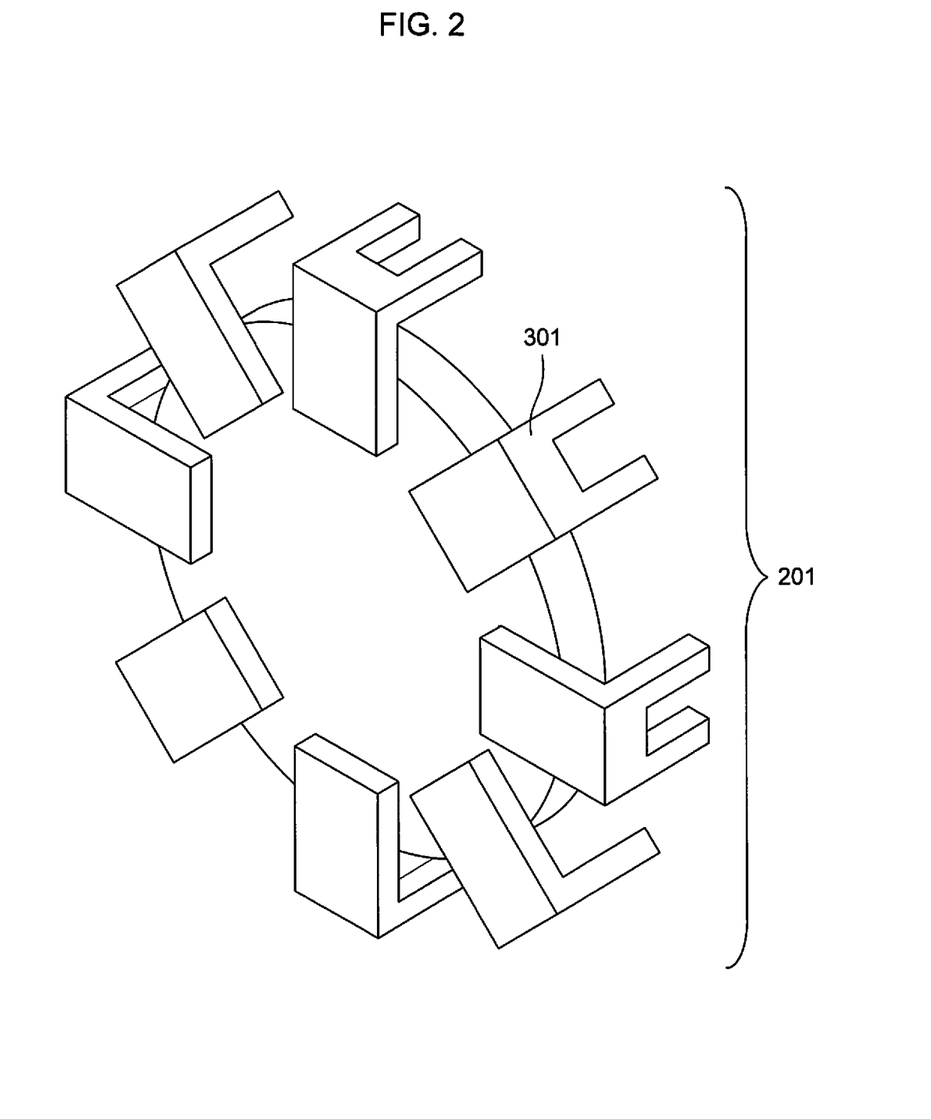
FIG. 2 is a schematic view of a tool magazine including a plurality of grips.

FIG. 1 is an external perspective view depicting an example of a machine tool 101 including a tool magazine 201 as a tool accommodation apparatus. FIG. 2 depicts an example of the tool magazine 201 including a plurality of grips 301. The grips 301 correspond to "tool holding unit" in Claims. The tool magazine 201 corresponds to "tool accommodation apparatus" in Claims. The tool accommodation apparatus can include one or more tool holding unit.

As depicted in FIG. 1, the machine tool 101 includes a main shaft 102 which a tool 401 can be attached to and detached from and the tool magazine 201 including the plurality of grips 301. A workpiece (not depicted) is mounted on a table 103, and the workpiece is machined by using the tool 401 attached to the main shaft 102. At the time of automatic tool replacement, the tool magazine 201 puts a tool holding unit where the target tool 401 is attached to the position of the main shaft 102, thereby delivering the tool 401 between the grip 301 and the main shaft 102.

Figure 3:
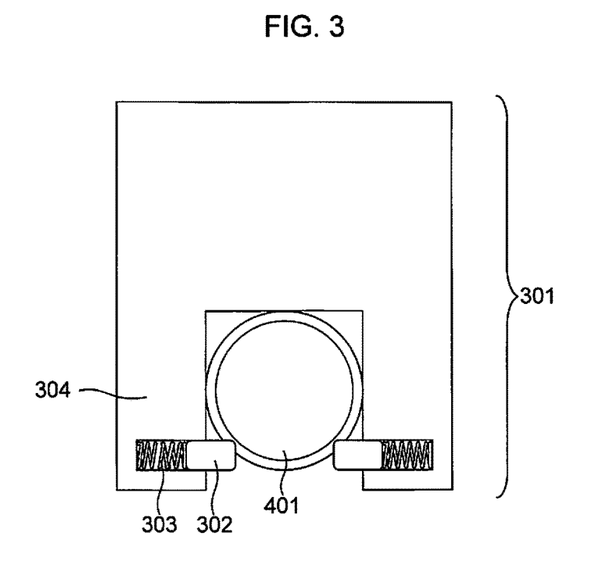
FIG. 3 is a schematic view of the structure of a grip of a type which presses a pin by a spring.
Figure 4:
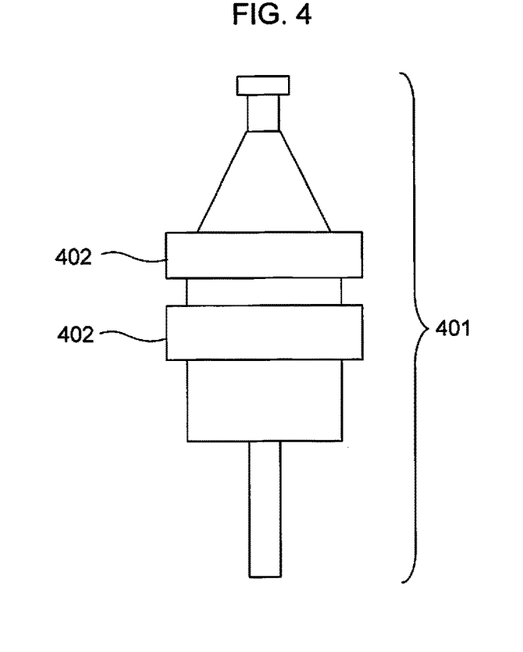
FIG. 4 is a schematic view of a tool.

FIG. 3 is a diagram depicting an example of a grip shape of each grip 301 included in the tool magazine 201. FIG. 4 is a diagram depicting an example of a tool shape of the tool 401. As depicted in FIG. 3, the grip 301 has paired grip arms 304. At a tip portion of each of the paired grip arms 304, a pin 302 is disposed. The pin 302, together with a spring 303, is attached into a hole drilled at the tip portion of the grip arm 304. The pins 302 are each pressed by the spring 303 in a projecting direction, and interpose tool flange portions 402 of the tool 401 therebetween to grip the tool 401.

As depicted in FIG. 4, the tool 401 includes two tool flange portions 402 in an axial direction. The two tool flange portions 402 are formed with a predetermined space. With the grip 301 gripping the tool 401, the pin 302 abuts on a portion between the tool flange portions 402.

Figure 5:
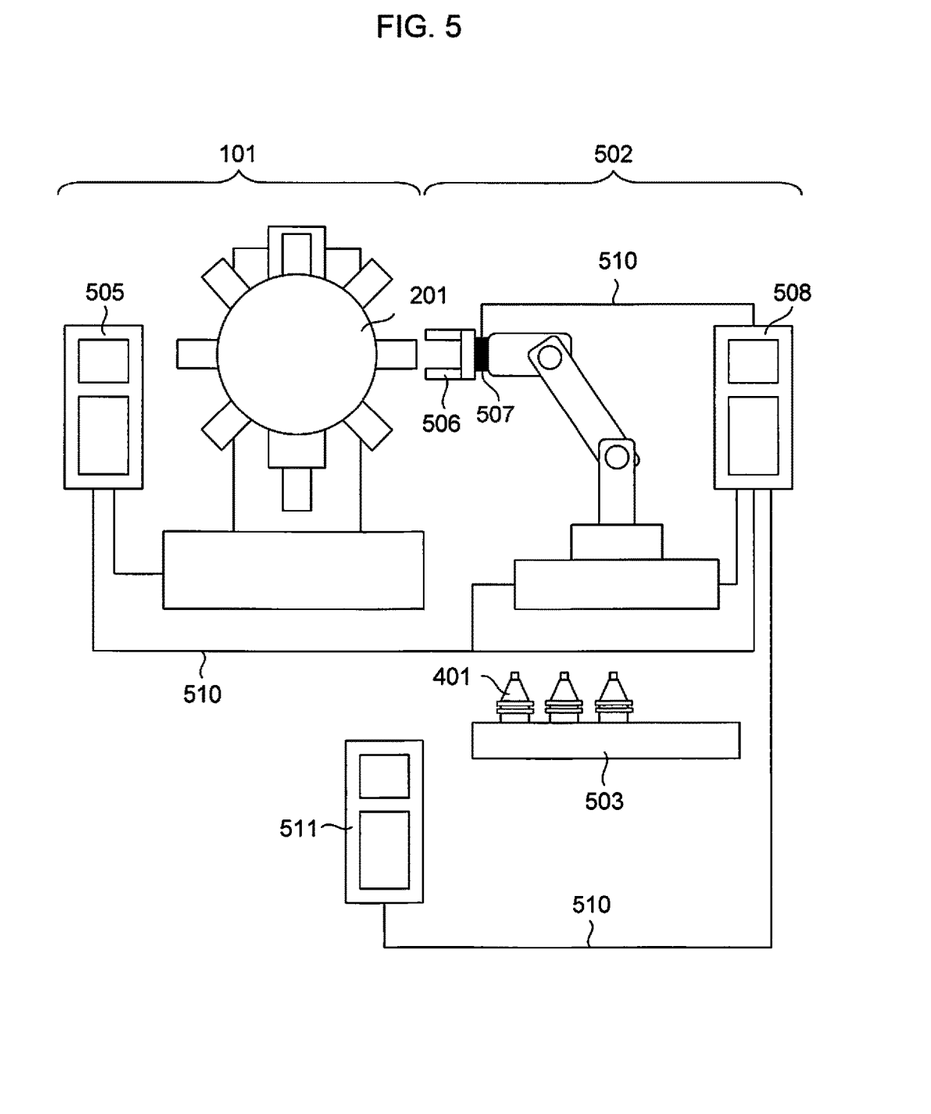
FIG. 5 is a schematic view of a machining system.

FIG. 5 is a diagram depicting a general outline of a machining system formed of the machine tool 101, a handling robot 502 set outside the machine tool 101, and a tool stocker 503 set outside the machine tool 101. Note that the structure of the machining system may not include the tool stocker 503. In this case, the tool 401 taken out from the machine tool 101 by the handling robot 502 is exported by an operator to a tool storage location.

The handling robot 502 can perform operation of detaching the tool 401 from the tool holding unit (grip 301) positioned at a tool attachment/detachment position of the tool magazine 201 in the machine tool 101 and transferring the tool 401 to a tool placement location (tool stocker 503), and operation of transferring the tool 401 from the tool placement location (tool stocker 503) and attaching the tool 401 to the tool holding unit (grip 301) positioned at the tool attachment/detachment position of the tool magazine 201.

The handling robot 502 has a hand portion 506, which is provided with a force sensor 507, which can detect a load applied to the hand portion 506. Also, a control apparatus 508 of the handling robot 502 and a control apparatus 505 of the machine tool 101 each have communication unit, and are connected via a data cable 510 capable of transmission and reception of information. Furthermore, the handling robot 502 includes communication unit for transmission and reception of information to and from a data server 511, and is connected via the data cable 510 to an external apparatus such as the data server 511.

Figure 6:
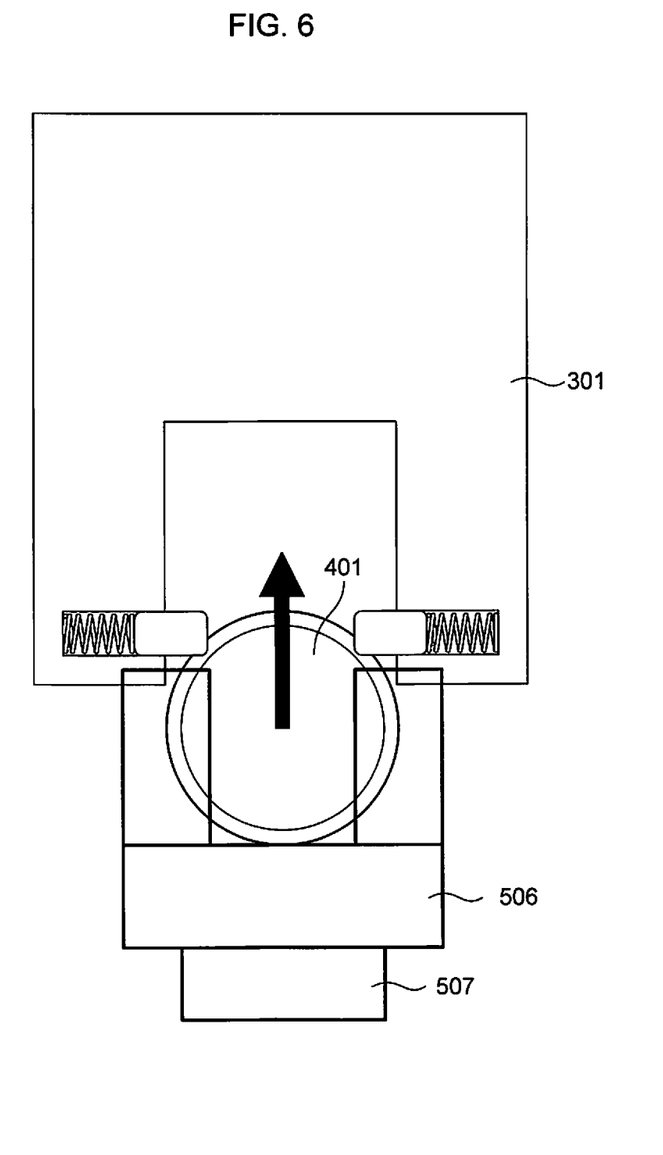
FIG. 6 is a schematic view depicting operation at the time of tool attachment.

FIG. 6 is a schematic view depicting operation when the handling robot 502 attaches the tool 401 to the grip 301. Here, to the hand portion 506 of the handling robot 502, a load for spreading the pins 302 so as to oppose the force of the springs 303 included in the grip 301 is applied (refer to FIG. 3). This load is detected by the force sensor 507 included in the hand portion 506. The force sensor 507 corresponds to a "load measuring apparatus" in Claims.

Load values detected by the force sensor 507 are once sent through the data cable 510 to the control apparatus 508 of the handling robot 502. Then, the load values detected by the force sensor 507 are further sent from the control apparatus 508 to the control apparatus 505 of the machine tool 101. In the control apparatus 505, load values may be stored in storage unit.

The control apparatus 505 of the machine tool 101 has a load threshold stored in advance. When the load exceeds the threshold, a determination is made that the gripping force of the grip 301 is decreased, and a message notifying the user as such is displayed on a display apparatus, not depicted, included in the control apparatus 505. The detected load values may be displayed on the display apparatus. A display apparatus which displays the detected load values is not limited to the display apparatus in the control apparatus 505, and the detected load values may be displayed on a display apparatus included in the control apparatus 508 of the handling robot 502. Note that exceeding the load threshold unit that the load falls below a threshold when the grip 301 has a normal gripping force.

With this, it is possible to early find a decrease in gripping force of the grip 301 included in the tool magazine 201. Therefore, it is possible to prevent a trouble such as a tool drop occurring due to a decrease in gripping force of the grip 301. Also, the load measurement values are transmitted to the data server 511, thereby allowing the operator to refer to the load measurement values.

Figure 7:
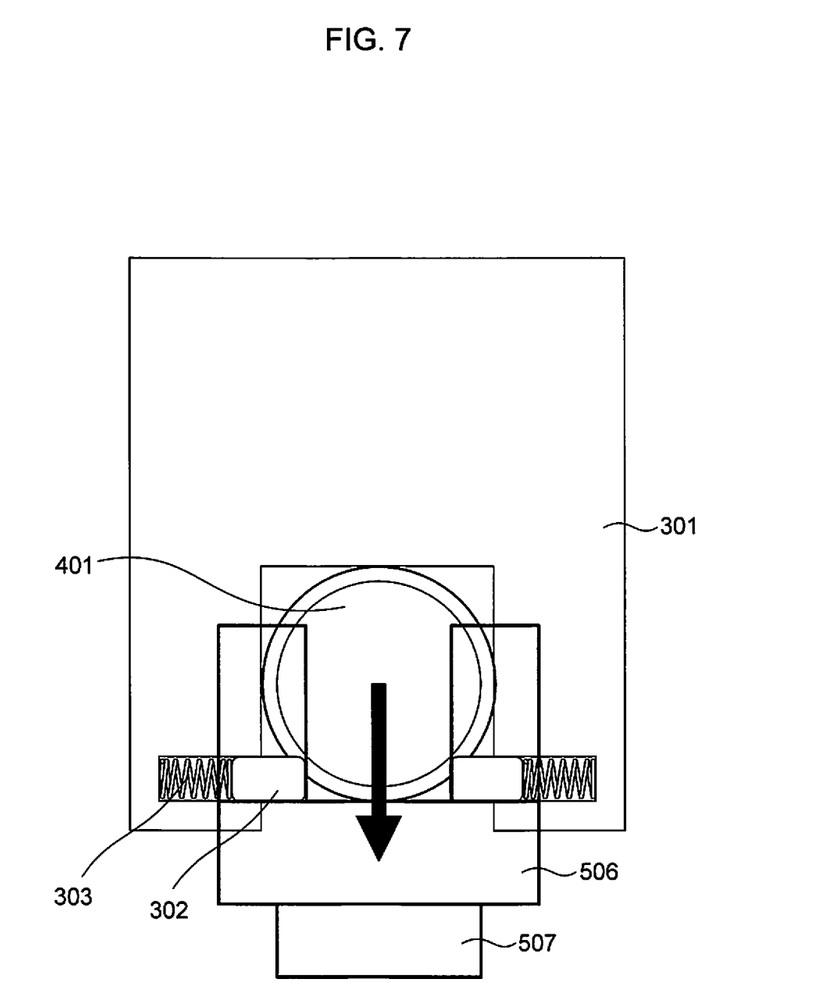
FIG. 7 is a schematic view depicting operation at the time of tool detachment.

While load detection when the handling robot 502 attaches the tool 401 to the grip 301 has been exemplarily described in the present embodiment, the present invention can be applied also when the handling robot 502 detaches the tool 401 from the grip 301, as depicted in FIG. 7. Thresholds for determining whether the tool gripping force of the grip 301 is normal when the tool 401 is attached to the grip 301 and when the tool 401 is detached from the grip 301 may be respectively set at appropriate values. Depending on the shape of the grip 301, the load on the hand portion 506 of the handling robot 502 may differ between the case of attachment of the tool 401 and the case of detachment thereof.

Figure 8:
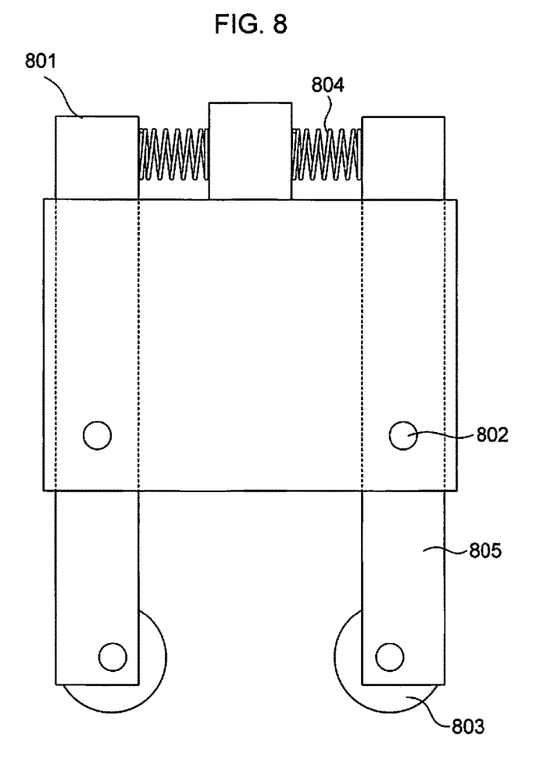
FIG. 8 is a schematic view of the structure of a grip of a type which presses a roller by a grip arm.

Also, while the grip 301 that has been exemplarily described in the present embodiment is of a type which presses the pin 302 by the spring 303, the scope of the invention is not limited to this. For example, as depicted in FIG. 8, a support 802 is provided to a grip arm 805 of each grip 801, and a roller 803 is provided at a tip of the grip arm 805. Also, a spring 804 is provided to a rear end of the grip arm 805. With the paired springs 804, the paired grip arms 805 can interpose the tool 401 therebetween. Note that the tool 401 is not depicted in FIG. 8. The present invention can be applied also to the grip 801 of the type described above. In addition, the present invention can be applied to a grip of a type which presses a grip tip to interpose and grip the tool 401 in any method.

While provision of the force sensor 507 as load measuring unit to the hand portion 506 of the handling robot 502 has been exemplarily described in the embodiment of the present invention described above, the present invention can be achieved also with a structure in which a load is measured by detecting a load torque applied to a drive motor of the handling robot 502.

Furthermore, while the control apparatus 505 of the machine tool 101 makes a determination as to a decrease in gripping force of the grip in the present embodiment, the structure may be such that the control apparatus 508 of the tool transfer apparatus (handling robot 502) makes a determination as to a decrease in gripping force of the grip and message display.

In addition, by providing the tool transfer apparatus (handling robot 502) with unit which automatically replaces the grip 301, 801 when a decrease in gripping force of the grip is detected, even if the gripping force of the grip is decreased, the machining system does not have to be stopped, and the machining system can be continuously operated without humans in attendance. Replacement of the grip 301, 801 may be made by a robot different from the handling robot 502.

Still further, by recording the measured loads at predetermined intervals, the life of the grip 301 can be predicted based on the ratio of load decrease or load decrease information of another grip 301 among the plurality of grips 301 included the same tool magazine 201.

Figure 9:
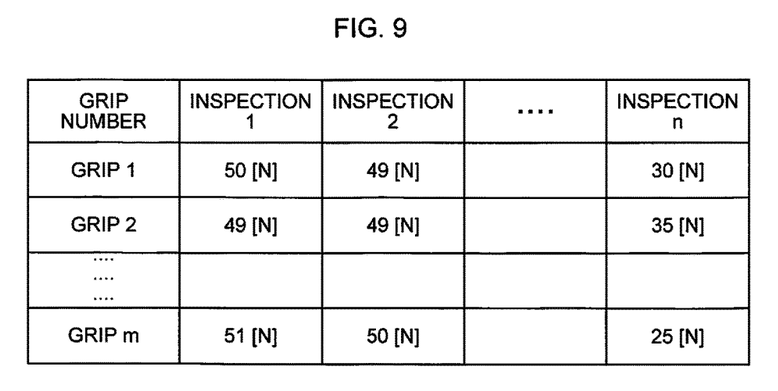
FIG. 9 is a diagram depicting that load values detected at predetermined intervals are stored.

FIG. 9 is a diagram depicting that load values detected at predetermined intervals are stored. The predetermined intervals include predetermined time intervals. In the machining system depicted in FIG. 5, the hand portion 506 of the handling robot 502 is caused to grip the tool 401 at predetermined time intervals (for example, every week), attachment and detachment of the tool 401 is performed between the hand portion 506 and each grip 301 of the tool magazine 201, load values at the time of attachment and detachment are detected by the force sensor 507, and the detection results are stored in the control apparatus 505, the control apparatus 508, or the data server 511, as depicted in FIG. 9. Alternatively, the detection results may be stored every other time of attachment and detachment of the tool 401 to and from each grip 301 of the tool magazine 201.

For example, in a machining system, if a decrease in load on a grip GA of the tool magazine 201 until the life ends has been recorded, a decrease in load on a grip GB of the same tool magazine 201 can be considered as also following a similar process. Therefore, by monitoring the load, the remaining life of the grip can be predicted.

Figure 10:
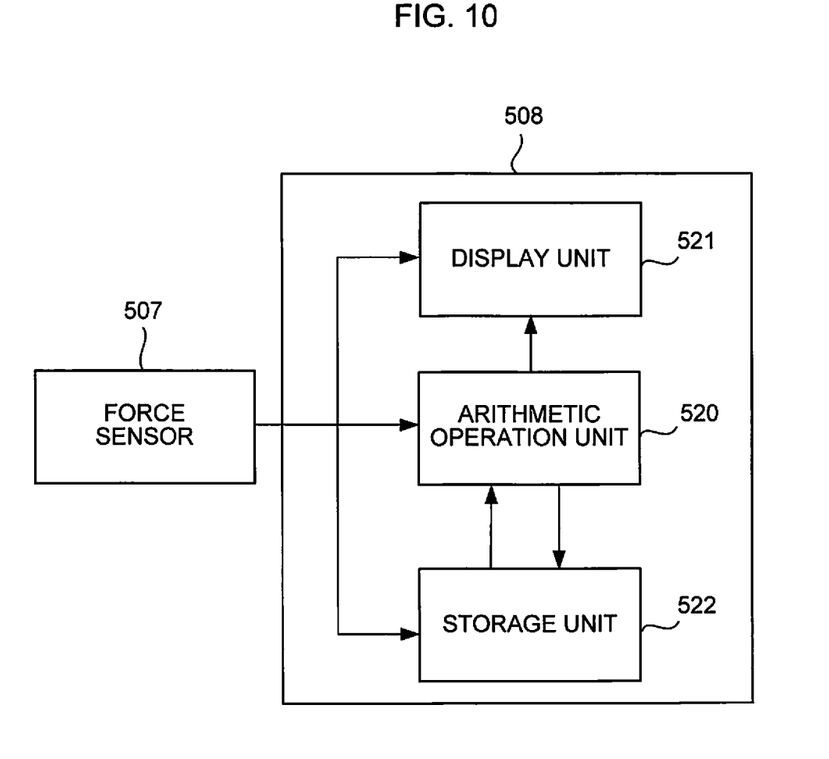
FIG. 10 is a diagram describing a control apparatus which receives load information detected by a force sensor.

FIG. 10 is a diagram describing a control apparatus which receives load information detected by the force sensor. The control apparatus 508 which controls the handling robot 502 receives, via communication unit, load information detected by the force sensor 507 when the tool 401 is attached to or detached from the grip 301, 801 of the tool magazine 201. The load information received by the control apparatus 508 may be displayed by a display unit 521, or may be stored in a storage unit 522. This storage may be performed at predetermined intervals (time intervals or intervals based on the number of times of attachment and detachment). In an arithmetic operation unit 520, in order to determine whether the tool gripping force of the grip 301, 801 is normal, an arithmetic operation of comparison with a threshold stored in advance in the storage unit 522 may be performed. The comparison result may be displayed on the display unit 521, or may be transmitted to the control apparatus 505 of the machine tool 101 or to the data server 511.

To measure the gripping force of the tool holding unit, a self-propelled robot may be used. As with the embodiment described above, this robot includes unit which measures a gripping force of the tool holding unit. In a control apparatus of the robot, the load value of the measured gripping force is compared with a threshold set in advance, thereby allowing a determination as to whether the gripping force is normal. Also, by storing data about the gripping force obtained by measurement and performing statistical analysis, the degree of decrease in gripping force can be predicted. With the self-propelled robot, the gripping force of the tool holding unit of the tool accommodation unit included in each of a plurality of machine tools can be efficiently measured, and a tool drop from the tool holding unit with a decreased gripping force can be prevented.

While the embodiment of the present invention has been described above, the present invention is not limited to the examples of the embodiment described above, and can be carried out in other modes by being modified as appropriate.

The invention claimed is:

1. A machining system comprising:
a machine tool including a tool accommodation apparatus having one or more tool holding unit; and
a tool transfer apparatus which attaches and detaches a tool to and from the tool holding unit of the tool accommodation apparatus, wherein
the tool transfer apparatus includes:
a load measuring apparatus which measures a load applied to the tool transfer apparatus when the tool is attached to or detached from the tool holding unit;
a storage unit which stores a threshold of the load when the tool is attached or a threshold of the load when the tool is detached; and
a notifying unit which compares the load measured by the load measuring apparatus and the threshold and makes a notification when the measured load value falls below the threshold of the load, the notification indicating as such.

2. A machining system comprising:
a machine tool including a tool accommodation apparatus having one or more tool holding unit; and
a tool transfer apparatus which attaches and detaches a tool to and from the tool holding unit of the tool accommodation apparatus, wherein
the machining system further comprises a communication unit which transmits and receives data between the tool transfer apparatus and the machine tool,
the tool transfer apparatus includes a load measuring apparatus which measures a load applied to the tool transfer apparatus when the tool is attached to or detached from the tool holding unit, and the machine tool includes:
a storage unit which stores a threshold of the load when the tool is attached or a threshold of the load when the tool is detached; and
a notifying unit which makes a notification when the load measured by the load measuring apparatus of the tool transfer apparatus and transmitted to the machine tool by the communication unit falls below the threshold of the load when the tool is attached or the threshold of the load when the tool is detached, the notification indicating as such.

3. The machining system according to claim 1, further comprising a display unit which displays the load measured by the load measuring apparatus.

4. The machining system according to claim 1, wherein the tool transfer apparatus includes a storage unit which stores the load measured by the load measuring apparatus.

5. The machining system according to claim 4, wherein storage of the load in the storage unit is performed at predetermined intervals.

6. The machining system according to claim 1, wherein the tool transfer apparatus includes a communication unit which transmits data of the load obtained through measurement by the load measuring apparatus to an external apparatus.

7. The machining system according to claim 1, wherein the tool holding unit of the tool accommodation apparatus is replaced when the load measured by the load measuring apparatus falls below the threshold of the load.

8. The machining system according to claim 1, wherein the tool transfer apparatus is a robot.

9. A tool transfer apparatus which attaches and detaches a tool to and from a tool holding unit of a tool accommodation apparatus included in a machine tool, the tool transfer apparatus comprising:
a load measuring apparatus which measures a load applied to the tool transfer apparatus when the tool is attached to or detached from the tool holding unit;
a storage unit which stores a threshold of the load when the tool is attached or a threshold of the load when the tool is detached; and
a notifying unit which compares the load measured by the load measuring apparatus and the threshold of the load and makes a notification when the measured load value falls below the threshold, the notification indicating as such.

10. The tool transfer apparatus according to claim 9, wherein the tool transfer apparatus is a self-propelled robot.

* * * * *